United States Patent
Akos et al.

(10) Patent No.: US 11,280,912 B2
(45) Date of Patent: Mar. 22, 2022

(54) HYBRID INTERFERENCE LOCALIZATION

(71) Applicant: The Regents of the University of Colorado, a body corporate, Denver, CO (US)

(72) Inventors: Dennis M. Akos, Boulder, CO (US); Ryan Blay, Westminster, CO (US); Nagaraj Channarayapatna Shivaramaiah, Boulder, CO (US)

(73) Assignee: The Regents of the University of Colorado, Denver, CO (US)

(*) Notice: Subject to any disclaimer, the term of this patent is extended or adjusted under 35 U.S.C. 154(b) by 455 days.

(21) Appl. No.: 16/246,177

(22) Filed: Jan. 11, 2019

(65) Prior Publication Data
US 2019/0219705 A1    Jul. 18, 2019

Related U.S. Application Data

(60) Provisional application No. 62/616,805, filed on Jan. 12, 2018.

(51) Int. Cl.
*G01S 19/21* (2010.01)
*G01S 19/26* (2010.01)
*G01S 5/06* (2006.01)
*G01S 5/02* (2010.01)
*G01S 19/14* (2010.01)

(52) U.S. Cl.
CPC ............ *G01S 19/21* (2013.01); *G01S 5/021* (2013.01); *G01S 5/0268* (2013.01); *G01S 5/06* (2013.01); *G01S 19/14* (2013.01); *G01S 19/26* (2013.01)

(58) Field of Classification Search
CPC .......... G01S 19/14; G01S 19/21; G01S 5/021; G01S 5/0215; G01S 5/0268
See application file for complete search history.

(56) References Cited

U.S. PATENT DOCUMENTS

| | | | |
|---|---|---|---|
| 5,936,571 A | 8/1999 | Desjardins | |
| 6,084,540 A | 7/2000 | Yu | |
| 6,166,690 A | 12/2000 | Lin et al. | |
| 6,246,861 B1 * | 6/2001 | Messier | G01S 5/021 370/330 |
| 6,707,422 B2 | 3/2004 | Sheynblat et al. | |
| 7,015,858 B2 | 3/2006 | Fuchser et al. | |

(Continued)

FOREIGN PATENT DOCUMENTS

CA    2296812 A1 *    8/2000

OTHER PUBLICATIONS

G. Mao et al., Online Calibration of Path Loss Exponent in Wireless Sensor Networks, IEEE Globecom 2006, 2006 (Year: 2006).*

(Continued)

*Primary Examiner* — Bernarr E Gregory
*Assistant Examiner* — Fred H Mull

(57) ABSTRACT

Various embodiments of the present technology generally relate to localization of one or more radio frequency interference (RFI) emitters. More specifically some embodiments relate to localization of RFI emitters that interfere with Global Navigation Satellite System (GNSS) receivers by integrating the location estimates of two or more localization techniques. Various embodiments may be used to more accurately estimate an interference source (e.g., an RFI emitter's location) than each localization technique separately.

21 Claims, 10 Drawing Sheets

(56) References Cited

U.S. PATENT DOCUMENTS

| | | | |
|---|---|---|---|
| 7,170,441 | B2 | 1/2007 | Perl et al. |
| 7,206,546 | B2 | 4/2007 | Renard et al. |
| 7,555,262 | B2 | 6/2009 | Brenner |
| 7,925,274 | B2 | 4/2011 | Anderson et al. |
| 7,978,137 | B2 | 7/2011 | Kalliola et al. |
| 8,138,975 | B2 | 3/2012 | Bull et al. |
| 8,810,452 | B2 | 8/2014 | Bull |
| 9,121,923 | B2 | 9/2015 | Bull et al. |
| 9,354,310 | B2 | 5/2016 | Visser et al. |
| 9,648,460 | B2 | 5/2017 | Harper |
| 9,651,652 | B2 | 5/2017 | Kpodzo et al. |
| 2010/0201570 | A1 | 8/2010 | Shemar et al. |
| 2013/0051255 | A1* | 2/2013 | Estevez .................. G01S 5/021 370/252 |
| 2016/0231426 | A1* | 8/2016 | Smith .................. G01S 5/0268 |
| 2017/0261615 | A1 | 9/2017 | Ying et al. |

OTHER PUBLICATIONS

S. Beladi et al., TDOA Based Transmitter Localization with Minimum Number of Receivers and Power Measurements, 2008 10th Intl. Conf. on Control, Automation, Robotics and Vision, p. 1259-1264, Dec. 2008 (Year: 2008).*

A.G. Dempster et al., Interference Localization For Satellite Navigation Systems, Proceedings of the IEEE, vol. 104(6), p. 1318-1326, Jun. 2016 (Year: 2016).*

J. Smidt et al., Joint Digitalization Scheme for Multiband GNSS Receivers, 2015 XVI Workshop on Information Processing and Control (RPIC), Jun. 2016 (Year: 2016).*

English Translation of J. Smidt et al., Joint Digitalization Scheme for Multiband GNSS Receivers (Year: 2021).*

Balaei, Asghar Tabatabaei, Doctoral Thesis, "Detection, Characterization And Mitigation of Interference In Receivers For Global Navigation Satellite Systems," The University of New South Wales, Sydney, Australia, 193 pages, Nov. 2007.

Bond, Kevin et al., Abstract for "Location of GPS Interference Using Adaptive Antenna Technology," Proceedings of the 13th International Technical Meeting of the Satellite Division of The Institute of Navigation, https://www.ion.org/publications/abstract.cfm?articleID=1444, Sep. 2000.

Dempster, Andrew G. et al., Abstract for "Interference Localization For Satellite Navigation Systems," Proceedings of the IEEE, vol. 104, Issue 6, https://ieeexplore.ieee.org/stamp/stamp.jsp?arnumber=7439734, Jun. 2016.

International Telecommunication Union, "Spectrum Monitoring Evolution," Report ITU-R SM.2355-0, 34 pages, Jun. 2015.

Jackson, B.R. et al., "Emitter Geolocation Estimation Using Power Difference of Arrival," Defence R&D Canada—Ottawa, Technical Report, 80 pages, May 2011.

Musicki Darko et al., "Geolocation Using TDOA And FDOA Measurements," 2008 11th International Conference on Information Fusion, pp. 1987-1994, Jun. 30-Jul. 3, 2008.

* cited by examiner

HYBRID INTERFERENCE LOCALIZATION

CROSS-REFERENCE TO RELATED APPLICATIONS

This application claims priority to U.S. Provisional Application No. 62/616,805 filed Jan. 12, 2018, which is incorporated herein by reference in its entirety for all purposes.

TECHNICAL FIELD

Various embodiments of the present technology generally relate to localization of one or more radio frequency interference (RFI) emitters. More specifically some embodiments relate to localization of interference of Global Navigation Satellite System (GNSS) receivers based on estimates generated from hybrid localization technique.

BACKGROUND

Global Navigation Satellite System (GNSS) provides autonomous geo-spatial positioning around the world often used for air, sea, and land navigation. GNSS systems typically include multiple satellites which are broadcasting signals that can be interpreted by receivers (e.g., in airplanes, automobiles, sea vessels and the like) and be used for estimating global position. Unfortunately, GNSS receivers can sometime experience interference that can hinder the accuracy of the position estimates. In many cases, the interference can be unintentional. However, in some cases the spoofing may be intentional (e.g., with spoofing or jamming). Any type of interference can be a significant concern.

Localizing the interference source can be a difficult task. Moreover, to effectively combat the harmful use of RFI emitters, detecting and localizing the RFI emitters' positions is important. Applications for localizing RFI emitters range from identifying semi-truck drivers with personal privacy devices to the military pinpointing and neutralizing hostile interference sources.

SUMMARY

Various embodiments of the present technology generally relate to localization of one or more radio frequency interference (RFI) emitters. More specifically some embodiments relate to localization of interference of Global Navigation Satellite System (GNSS) receivers based on estimates generated from hybrid localization technique.

In some embodiment, a method for dynamically detecting and localizing a radio frequency interference (RFI) emitter can include receiving a Global Navigation Satellite System (GNSS) signal at three or more receivers. A power measurement of the GNSS signal received at the three or more receivers can monitored. In response to any of the power measurements of the GNSS signal having crossed a threshold, the three or more receivers can be instructed to transmit the power measurements to a device. The power measurements of the GNSS signal from each of the three or more receivers can be processed to locate the RFI emitter. In some embodiments, the power measurements can be processed to locate the RFI emitter utilizing multiple localization estimates to generate a hybrid location estimate for the RFI emitter.

The hybrid location estimate may include using nonlinear least squares and/or may utilize multiple localization estimates to generate the hybrid location estimate by generating estimates with at least a time-difference-of-arrival (TDOA) technique and a power-difference-of-arrival (PDOA) technique. The localization estimate with the TDOA technique can include finding an estimate with a weighted non-linear least squares technique. The hybrid location estimate can be generated in some embodiments by calibrating a path-loss coefficient for the PDOA technique based on the TDOA estimate and/or determining the location of the RFI emitter with the use of a combined weighted non-linear least squares technique. In some embodiments, the RFI emitter may be repeatedly or continuously localized by a reiterative position estimate.

In various embodiments, a method for localizing a position of an interference source can include processing realtime data collected by at least three receivers (e.g., GNSS receivers). At least two localization estimates can be generated (e.g., using different techniques such as, but not limited to, TDOA and/or PDOA) for the interference source based on the processed data. Then, a hybrid position estimate can be generated for the interference source based on the at least two localization estimates. In some embodiments, the path-loss coefficients for the PDOA localization estimate can be based on the TDOA localization estimate.

In some embodiments, the hybrid position estimate for the interference source can be computed by generating by weighting the at least two localization estimates and reiteratively estimating the position of the interference source using previous estimations of position to scale the weights of the localization estimates and track the interference source through time.

Embodiments of the present invention also include computer-readable storage media containing sets of instructions to cause one or more processors to perform the methods, variations of the methods, and other operations described herein.

Some embodiments provide for a system for detecting and localizing a radio frequency interference (RFI) emitter. The system may include one or more sensors, a detection engine, a processing module, a localization estimator, a hybrid localization estimator, and/or an estimation module. The sensor can be configured to measure power from a signal generated by a satellite system (e.g., GNSS). In some embodiments, the sensor can measure power from the signal generated by the satellite system uses automatic gain control (AGC). The AGC measurements can be leveraged to identify an increase in RF power transmitted by RFI emitters, and two or more localization techniques may be used to estimate the position of the emitters.

The detection engine can be configured to detect a change in power of the signal generated by the satellite system. The processing module can be configured to generate, in response to the detection engine detecting change in the power of the signal that exceeds a designated threshold, processed data (e.g., filter and requantize the IF data) from real-time intermediate frequency (IF) data collected from multiple receivers. The localization estimator can be configured to generate at least two localization estimates for the RFI emitter based on the processed data. The hybrid localization estimator to generate a position estimate for the RFI emitter based on the at least two localization estimates. The estimation module can be configured to reiteratively estimate the position of the RFI emitter using previous estimations of position to scale weights of the localization estimates.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings.

Figure 1:
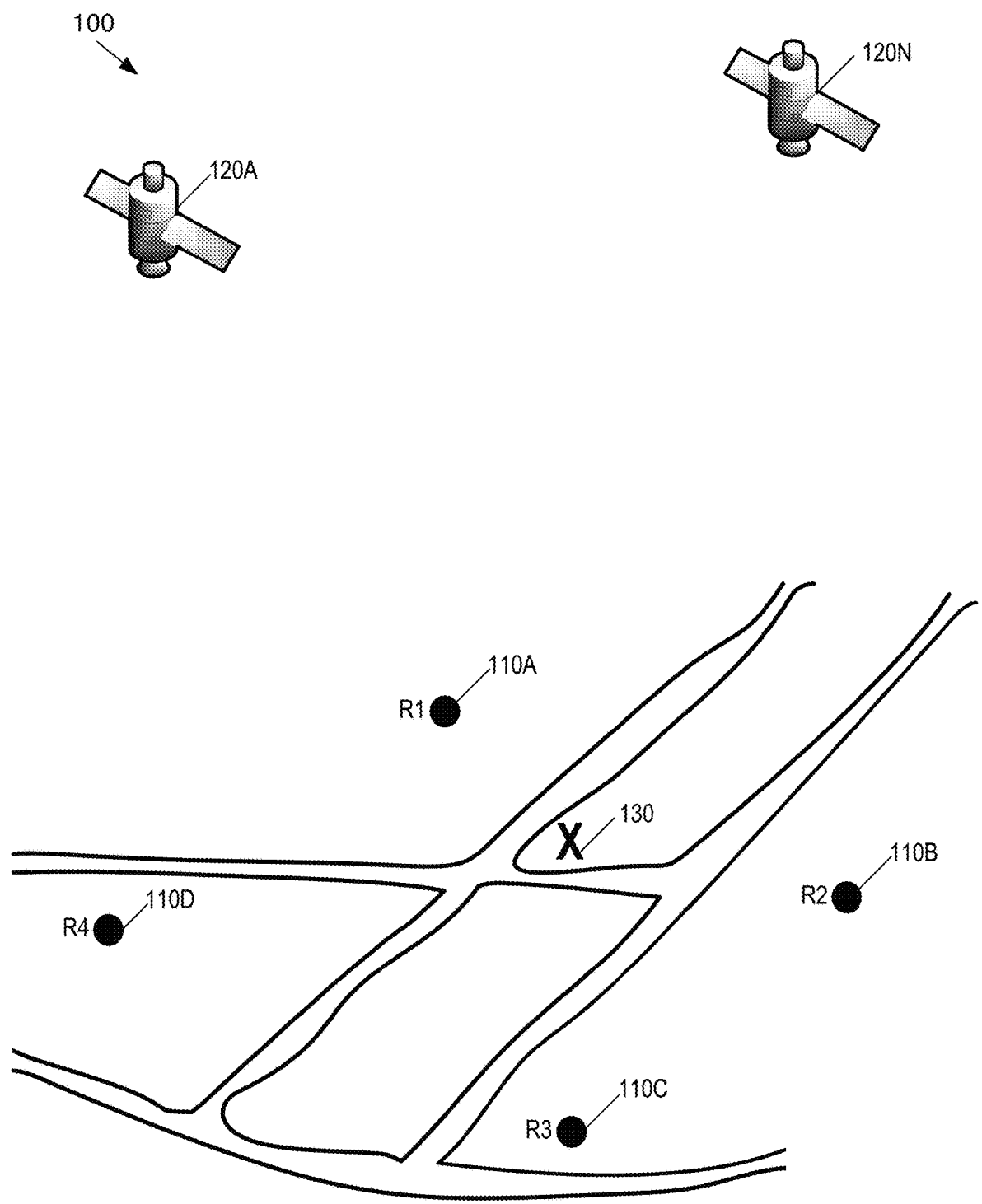
FIG. 1 illustrates an example of an environment in which some embodiments of the present technology may be utilized.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to localization of a radio frequency interference (RFI) emitter. More specifically some embodiments relate to localization of radio frequency interference of Global Navigation Satellite System (GNSS) receivers using a hybrid approach by integrating multiple localization techniques. GNSS includes the United States' Global Positioning System (GPS), GLONASS, Galileo, Beidou, and other regional systems. Interference in GNSS receivers has been a significant concern for some time with the advent of spoofing and jamming. In order to detect and localize RFI emitters, AGC measurements can be leveraged in some embodiments to identify an increase in RF power transmitted by RFI emitters, and two or more localization techniques may be used to estimate the position of the emitters. For example, some embodiments may use Time-Difference-of-Arrival (TDOA), Power-Difference-of-Arrival (PDOA), Phase-of-Arrival, Phase-Difference-of-Arrival, Frequency-Difference-of-Arrival (FDOA), Time-of-Flight, Angle-of-Arrival (AoA), and/or other techniques. In order to localize an RFI emitter, some embodiments may use at least three receivers with a geometry around the expected emitter's location.

In some embodiments, the system leverages two or more localization techniques to provide a better estimate of location of the radio interference than each algorithm separately. For example, TDOA and PDOA may be utilized. TDOA is well equipped for accurate localization when the frequency band the receiver is using is not jammed. PDOA works independent of whichever frequency bands are being jammed. Together, these localization techniques can iteratively improve hybrid estimates using each other's location estimation and can work in a far wider range of circumstances. A synthesis of TDOA and PDOA may be used to estimate the most likely location of the emitter using a novel weighted approach.

Even though TDOA techniques are more precise than PDOA techniques, the hyperbolas that result from TDOA sometimes do not all intersect in the same location. Most often this is due to multipath or blocked line-of sight which delays the signal reaching the receivers. PDOA can supplement the TDOA result by providing a rough estimate that can distinguish one TDOA intersection from another. This results in a higher confidence in the estimated location and determines a baseline point to then iterate on. In a dynamic approach used by various embodiments, this would allow an emitter's location to be tracked through time more accurately than either algorithm alone.

The TDOA technique essentially works by finding the delay between an emitter's signal reaching one receiver and the signal reaching another receiver. This delay leads to a hyperbola of potential interference locations between a pair of receivers. With a combination of three or more receivers, the multiple hyperbolas intersect and give the location of an active interference source. The PDOA technique on the other hand works by using the difference in signal strength (quantified by the AGC) to determine the most likely location of the jamming device. For both techniques, a non-linear least-squares estimation method is used to find the emitter's position.

One reason for combining the two techniques is to provide a wider range of functionality. The TDOA technique works well until the receiver is no longer able to provide accurate timing information due to propagation errors. However, the PDOA technique does not require accurate timing information and is able to supplement the TDOA technique to improve propagation errors. On the other hand, the PDOA techniques is difficult to use effectively because of the unknown path-loss coefficient that depends on terrain, the medium, and the antenna configuration. The TDOA localization estimates may be used to calibrate the path-loss coefficients to make the PDOA algorithm's localization estimate more reliable.

In many cases, there is no need for a hybrid technique. However, as soon as accurate timing information is not available, TDOA is not sufficient to ensure accurate localization estimation. Also, for Continuous Wave (CW) interference, TDOA cannot distinguish the correct cross-correlation peak, but PDOA provides enough resolution required to choose the correct peak.

Furthermore, a dual-frequency approach may improve performance of detecting and localizing an RFI emitter. The benefits of a dual-frequency approach are using L2C signal data to provide accurate timing to localize an L1 RFI emitter and vice versa. In three different tests, a wide-band RFI emitter was used that was on for 10 seconds to jam L1 and ten seconds to jam L2C with more than a minute between the two signals. All three tests were stationary tests to assess the accuracy when the emitter was static, and an additional test was performed with the emitter held outside the window of a moving car with L1 and L2C signals being transmitted. The results from using two frequencies is compared to propagation of time using only one signal.

Localization of RFI emitters can have applications ranging from identifying semi-truck drivers with personal privacy devices to the military being able to pinpoint and neutralize hostile interference. A sophisticated jamming entity would most likely have a complex jamming technique which would require better functionality in order to localize the RFI emitter. For that reason, different localization algorithms are combined in a hybrid system to improve detection and localization of one or more RFI emitters.

Various embodiments of the present technology provide for a wide range of technical effects, advantages, and/or improvements to computing systems and components. For example, various embodiments include one or more of the following technical effects, advantages, and/or improvements: 1) intelligent localization of interference sources; 2) integrated use of signal strength and signal interception; 3) cross-platform integration of different GNSS receivers; and/ or 4) changing the manner in which data can be utilized to localize interference sources.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to a GNSS environment to accurately show the position of an RFI emitter, embodiments of the present technology are equally applicable to various other applications.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

FIG. 1 illustrates an example of an environment 100 in which some embodiments of the present technology may be utilized. R1, R2, R3, and R4 (110A-110D) represent GNSS receivers configured to receive signals from satellites 120A-120N. From the signals generated by satellites 120A-120D, the receivers 110A-110N can compute corresponding location estimates. Typically, these location estimates are very accurate and the accuracy may depend on whether the receivers are military or commercial receivers.

Unfortunately, interference sources can hinder receivers R1-R4 from receiving, properly processing the signals from satellites 120A-120N, and/or accurately computing the location estimates. The X in FIG. 1 marks the location of an interference source 130 (e.g., RFI emitter) that interferes with wireless communication between the GNSS satellites 120A-120N and the receivers 110A-110D. Interference source 130 may be an RFI emitter. Typically, RFI emitters are often hand-held and can be both moving or stationary. For example, an RFI emitter can be turned on in a moving vehicle, or can be turned on with a fixed location. The GNSS receivers 110A-110D are often hand-held or embedded in hardware and thus can be stationary or moving as well.

Detecting the presence of RFI is straightforward with the use of the receiver's AGC output. However, in order to localize, there needs to be at least three receivers with a geometry around the expected jammer's location. This can have applications ranging from identifying semitruck drivers with personal privacy devices to the military being able to pinpoint and neutralize hostile interference. A sophisticated jamming entity would most likely have a complex jamming technique which would require better functionality in order to localize it. For that reason, various embodiments of the present technology provide a hybrid of multiple (e.g., 2 or more) localization estimates.

Figure 2:
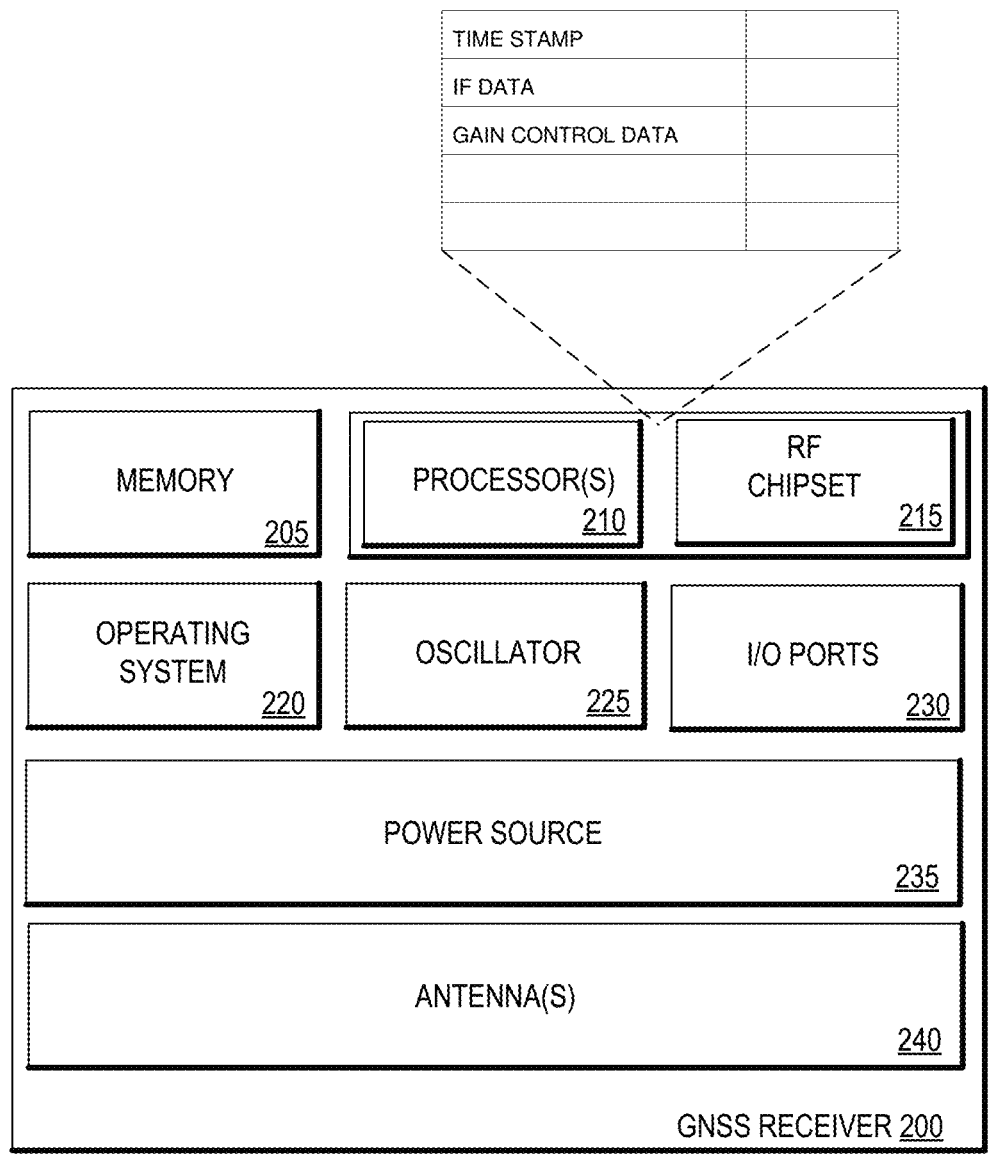
FIG. 2 illustrates a set of components to detect and localize an RFI emitter in accordance with one or more embodiments of the present technology.

FIG. 2 illustrates a set of components of a GNSS receiver 200 in accordance with one or more embodiments of the present technology. As shown in FIG. 2, the GNSS receiver 200 may include memory 205 (e.g., volatile memory and/or nonvolatile memory), one or more processors 210, an RF chipset 215, an operating system 220, an oscillator 225, I/O ports 230, a power source 235 (e.g., a battery), antenna(s) 240, and/or additional components (e.g., laptop, displays, audio interfaces, keypads or keyboards, and other input and/or output interfaces).

Memory 205 can be any device, mechanism, or populated data structure used for storing information. In accordance with some embodiments of the present technology, memory 205 can encompass any type of, but is not limited to, volatile memory, nonvolatile memory and dynamic memory. For example, memory 205 can be random access memory, memory storage devices, optical memory devices, media magnetic media, floppy disks, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205.

Memory 205 may be used to store instructions for running one or more applications or modules on processor(s) 210. For example, memory 205 could be used in one or more embodiments to house all or some of the instructions needed to execute the functionality or controlling RF chipset 215, operating system 220, oscillator 225, or I/O ports 230, and/or additional components. Operating system 220 can provide a software package that is capable of managing the hardware resources of the detection and localization system. Operating system 220 can also provide common services for software applications running on processor(s) 210.

Processor(s) 210 are the main processors of GNSS receiver 200, which may include application processors, baseband processors, various coprocessors, and other dedicated processors. For example, processor(s) 210 can provide the processing power to support software applications, memory management, graphics processing, and multimedia. Processors 210 may be communicably coupled with memory 205 and configured to run the operating system 220, the user interface, and the applications stored on memory 205 or data storage component (not shown). Processors 210 may be configured to perform signal processing and implement/manage real-time radio transmission operations of RF chipset 215. Processor(s) 210 along with the other components may be powered by power supply 235. Processor(s) 210 may control the frequency of oscillator 225 and send data over the I/O ports 230 to a laptop or user terminal or device (not shown). The volatile and nonvolatile memories found in various embodiments may include storage media for storing information such as processor-readable instructions, data structures, program modules, or other data. Some examples of information that may be stored include basic input/output systems (BIOS), operating systems, and applications.

RF chipset 215 can enable the receiver to communicate with GNSS, other devices, servers, or platforms by transmitting and receiving wireless signals using licensed, semi-licensed or unlicensed spectrum over a telecommunications network or RF systems. These signals can include location, timing information (e.g., time stamp), intermediate frequency (IF) data, and AGC data as well as other data. Accurate timing data may be provided by a connected clock and/or the receiver hardware. In accordance with various embodiments, the timing data and IF data may be used for TDOA localization, while the AGC data may be used for PDOA localization. In accordance with some embodiments of the present technology, the GNSS receiver 200 may communicate over a wired connection or other communication medium as a possible alternative to utilizing RF chipset 215.

While not illustrated in FIG. 2, in some embodiments, GNSS receiver 200 may include additional components for localization computations. For example, some embodiments may include, one or more sensors, a detection engine, a processing module, a localization estimator, a hybrid localization estimator, and/or an estimation module. In other embodiments, these components may be located in a separate device communicably coupled to GNSS receiver. In some embodiments, the sensor can be configured to measure power from a signal generated by a satellite system (e.g., GNSS). In some embodiments, the sensor can measure power from the signal generated by the satellite system uses automatic gain control (AGC). The AGC measurements can be leveraged to identify an increase in RF power transmitted by RFI emitters, and two or more localization techniques may be used to estimate the position of the emitters.

The detection engine can be configured to detect a change in power of the signal generated by the satellite system. The processing module can be configured to generate, in response to the detection engine detecting change in the power of the signal that exceeds a designated threshold, processed data (e.g., filter and requantize the IF data) from real-time intermediate frequency (IF) data collected from multiple receivers. The localization estimator can be configured to generate at least two localization estimates for the RFI emitter based on the processed data. The hybrid localization estimator to generate a position estimate for the RFI emitter based on the at least two localization estimates. The estimation module can be configured to reiteratively estimate the position of the RFI emitter using previous estimations of position to scale weights of the localization estimates.

Figure 3:
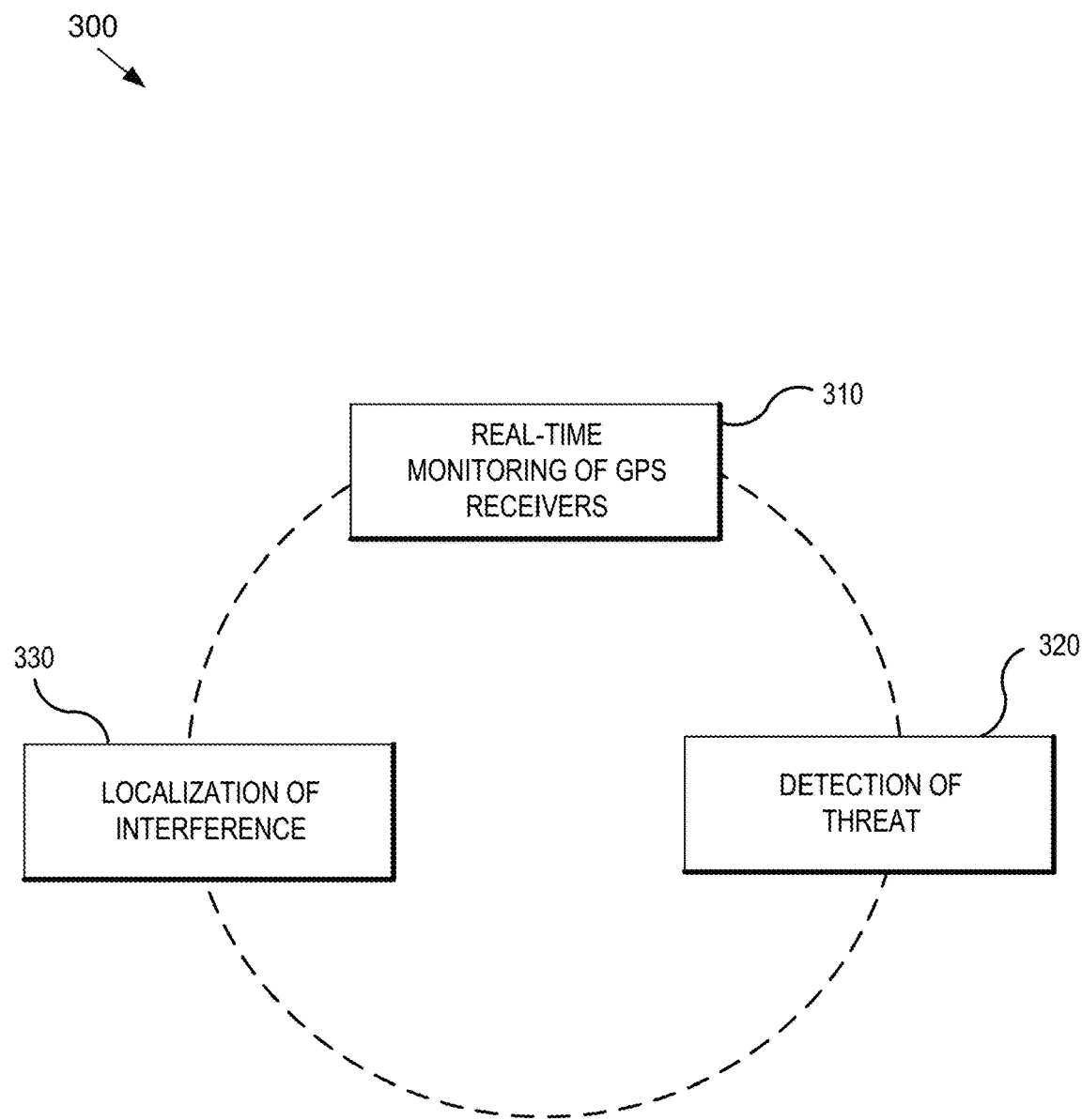
FIG. 3 illustrates a block diagram of a method to detect and localize an RFI emitter in accordance with some embodiments of the present technology.

FIG. 3 illustrates a block diagram of a method 300 that can be used to detect and localize an RFI emitter in accordance with some embodiments of the present technology. As illustrated in FIG. 3, the GNSS can be a Global Positioning System (GPS). In operation 310, the system monitors (e.g., in real-time) the GPS receivers. This consists of a periodic check of the input power value obtained via AGC or similar means. In operation 320, when a drop in AGC occurs, the system detects an RFI emitter that may prevent the receiver from receiving a GPS signal. In accordance with various embodiments, a threat may be identified when a threshold AGC value that must be reached before detection and/or a specified number of AGC measurements that is below that threshold. If an RFI emitter is detected, operation 330 can estimate the location of the RFI emitter using a combination of localization algorithms. For example, this can include using TDOA and PDOA to estimate the emitter's location.

Figure 4:
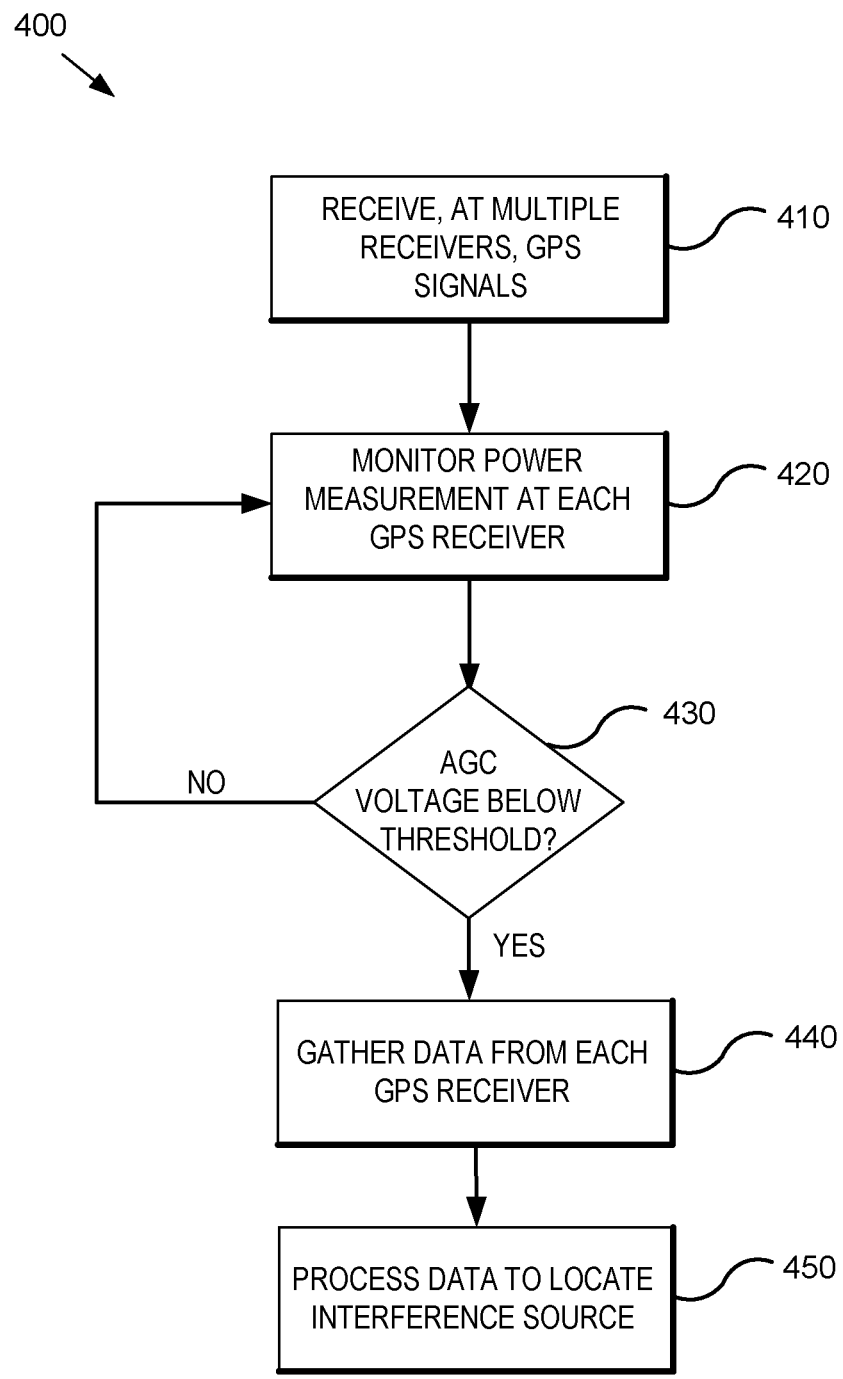
FIG. 4 is a flowchart illustrating a set of operations for detecting and localizing an RFI emitter in accordance with one or more embodiments of the present technology.

FIG. 4 is flowchart 400 illustrating a set of operations 400 for detecting and localizing an RFI emitter in accordance with one or more embodiments of the present technology. First in operation 410, GNSS receivers (e.g., GPS receivers) can receive signals from the GPS system (or other GNSS system), which may include signals from GPS satellites or ground based transmitters. In monitoring operation 420, power measurements can be monitored on all receivers. In accordance with various embodiments, the power measurements may be individually monitored by each of the receivers. In other embodiments, the receivers may be configured to transmit power measurements to an external device (e.g., a monitoring platform).

In determination operation 430, a determination is made as to whether the RF power of the RFI emitter causes the AGC voltage for one or more receivers to drop below a threshold. The AGC voltage is inversely proportional to the received power of a signal. As such, the AGC voltage drops because with a larger received power, the gain does not to amplify the signal as much. As a result, this larger than normal power (or lower AGC voltage) may be an indication of an interference source. When determination operation 430 determines that the AGC voltage has not dropped below a set threshold, then determination operation 430 branches to monitoring operation 420. When determination operation 430 determines that the AGC voltage has dropped below a set threshold, then determination operation 430 branches to gathering operation 440 which gathers data from all of the receivers. The data from all the receivers can be aligned by using the accurate time measurements given by processing the GNSS IF data. Finally, the system estimates the location of the interference source in operation 450.

In one or more embodiments of operation 450, a TDOA estimate of the emitter's position can be generated. Then, the TDOA location estimate can be used to calibrate the PDOA algorithm to determine the path-loss coefficients that would work the best. Next TDOA/PDOA localization estimates can be combined using a non-linear least squares algorithm with the weights of the PDOA determined using the calibrated path-loss coefficients. The TDOA and PDOA portions of the non-linear least squares algorithm may also be weighted depending on the amount of propagation from accurate timing information and the ratio of the first cross-correlation peak to the second peak. As localization estimates continue through time, the hybrid technique may also leverage previous location estimates to provide better confidence in the position of the RFI emitter. In other embodiments, different and/or additional position estimates can be generated using other techniques which can be integrated to generate more accurate estimates. In some embodiments, the system can dynamically select estimation techniques based on the environment and other feedback signals.

Figure 5:
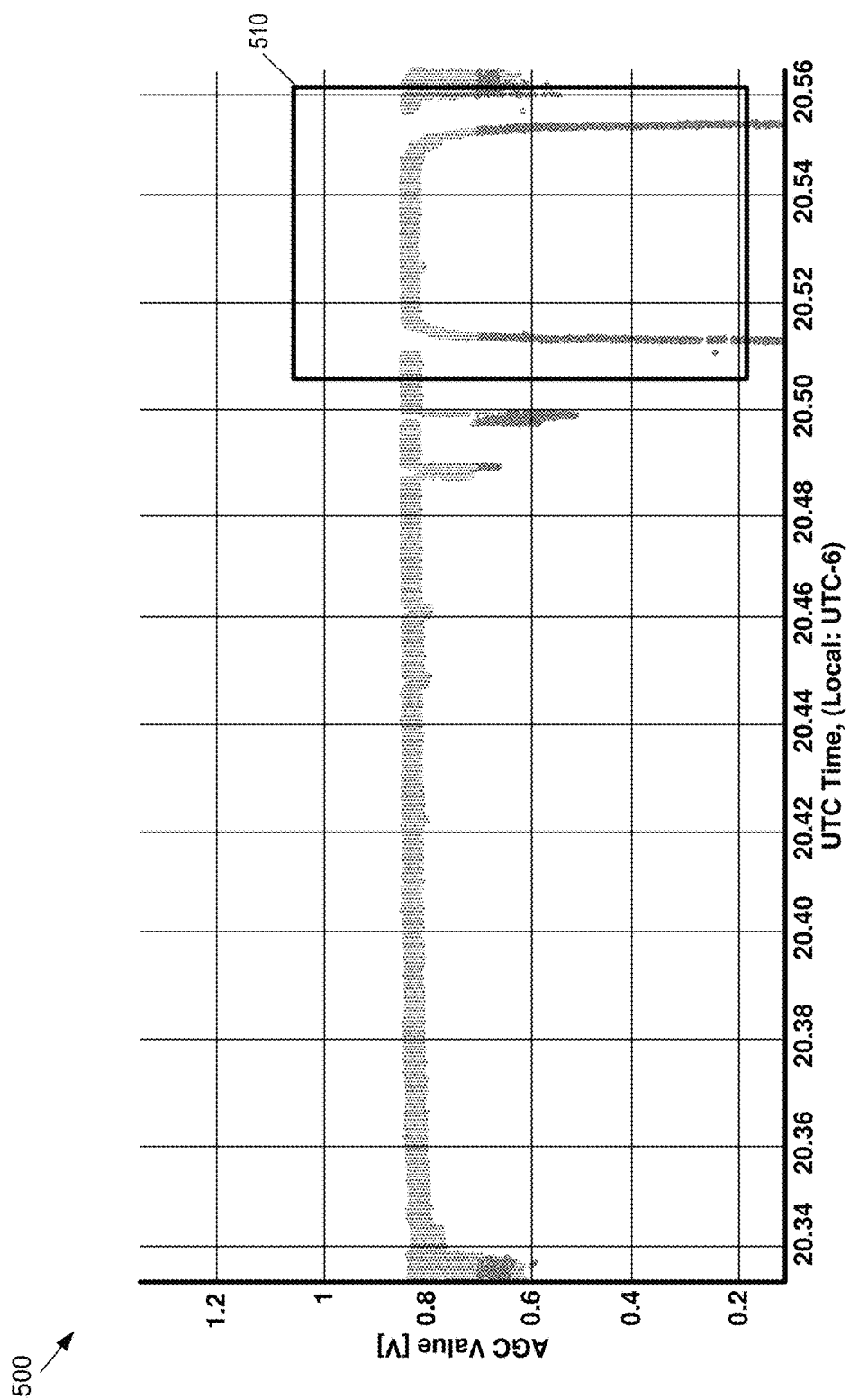
FIG. 5 is a graph illustrating automatic gain control (AGC) versus time used to detect an RFI emitter in accordance with one or more embodiments of the present technology.

FIG. 5 is a graph 500 illustrating AGC versus time used to detect an RFI emitter in accordance with one or more embodiments of the present technology. As the RF power of the RFI emitter increases, the AGC of a receiver decreases to maintain the same output. If the AGC drops below a threshold, then an RFI emitter may have been detected. In this example, detection occurs when the AGC voltage drops below a threshold. Box 510 highlights the time where the AGC voltage has dropped below a threshold. In accordance with various embodiments, the threshold may be a static threshold setting (e.g., 0.4, 0.5, etc.). Other embodiments may dynamically set the threshold setting based on one or more factors. For example, some embodiments may use an average of a recent window of AGC power voltages that have minimal variance. Other embodiments may allow a user to select a sensitivity level (e.g., depending on an application) which could then dynamically set the power threshold.

Figure 6:
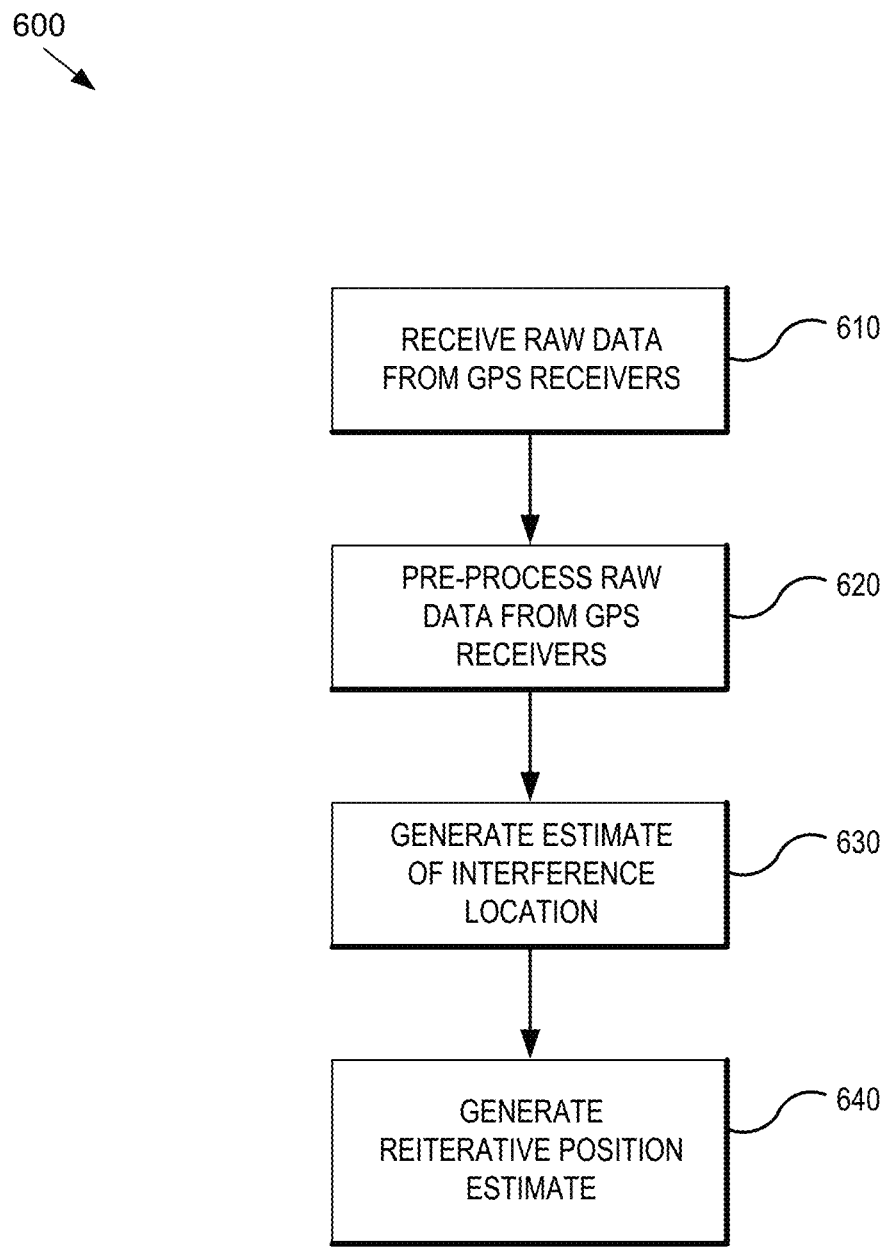
FIG. 6 is a flowchart illustrating a set of operations for localizing an RFI emitter in accordance with some embodiments of the present technology.

FIG. 6 is flowchart 600 illustrating a set of operations for localizing an RFI emitter in accordance with some embodiments of the present technology. In operation 610, raw GPS data can be received from all of the receivers. The raw data can be pre-processed in operation 620. Estimates of the location of RF interference can then be generated in operation 630.

Furthermore, in some embodiments, a continuous localization approach may be used as shown in operation 640. When looking at more than one estimate, this approach provides significant benefits. As some embodiments utilize a hybrid technique that begins in the presence of interference, the TDOA weights can be scaled to have a larger impact. However, after several successive location estimations, the PDOA estimates can be scaled to have more of an impact so that PDOA estimates can help correct the TDOA estimates once TDOA loses accurate timing information. Also, with successive location estimations, accuracy improves because a continuous localization approach can leverage the previous location estimates.

Figure 7:
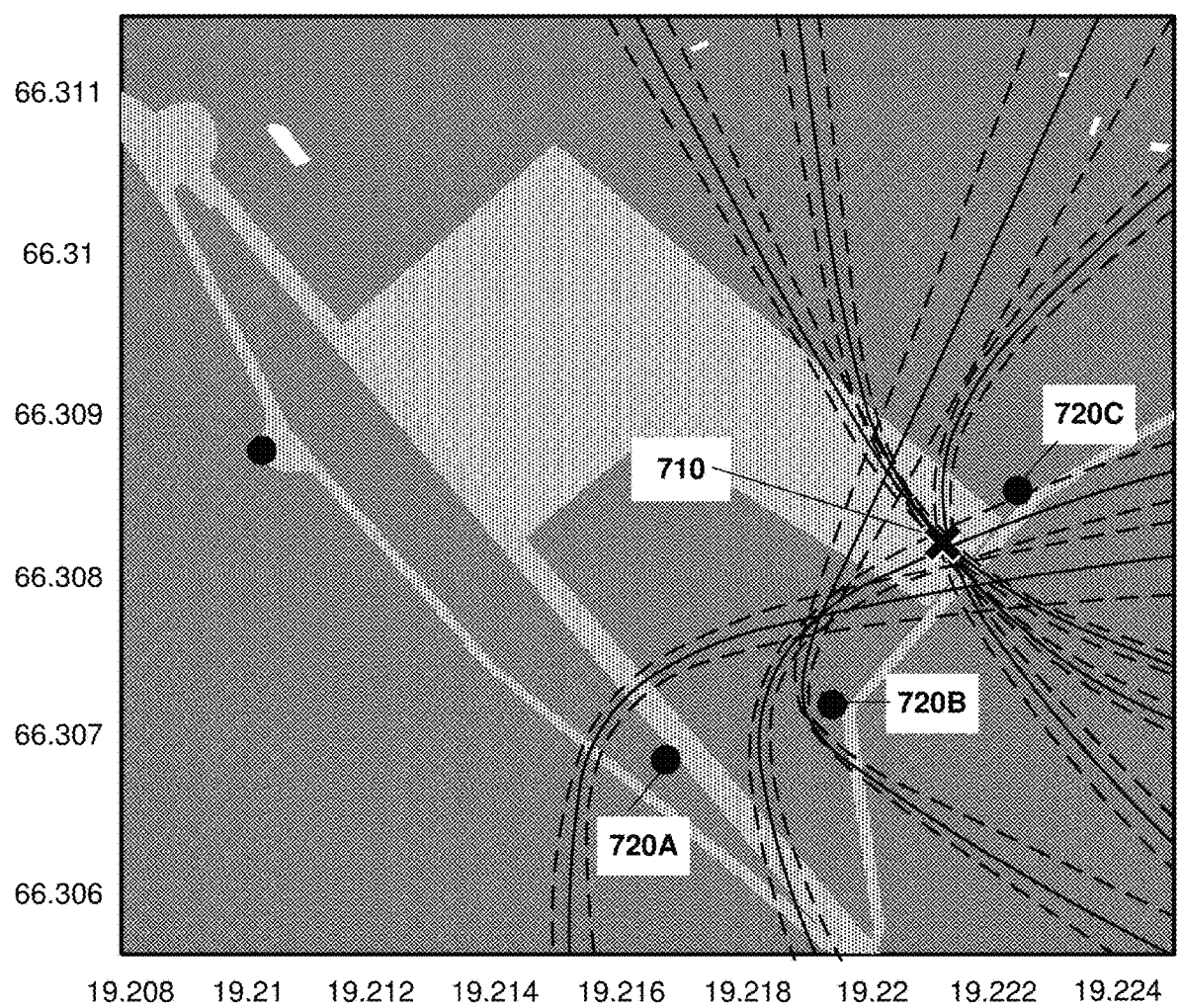
FIG. 7 illustrates an example of using hyperbolas to localize an RFI emitter in accordance with one or more embodiments of the present technology.

FIG. 7 illustrates an example of using hyperbolas to localize an RFI emitter 710 in accordance with one or more embodiments of the present technology. FIG. 7 shows the convergence of hyperbolas, and the location estimate for the RFI emitter 710, shown by a X. This figure shows the several hyperbolas that are created using the TDOA localization with the emitter estimate found with the hybrid algorithm. Each pair of receivers 720A-720C corresponds to a different hyperbola that is calculated as the possible locations of the emitter given the measurements from the two receivers. The hyperbolas most often do not exactly intersect, so the localization algorithms determine the most likely location estimate.

Figure 8:
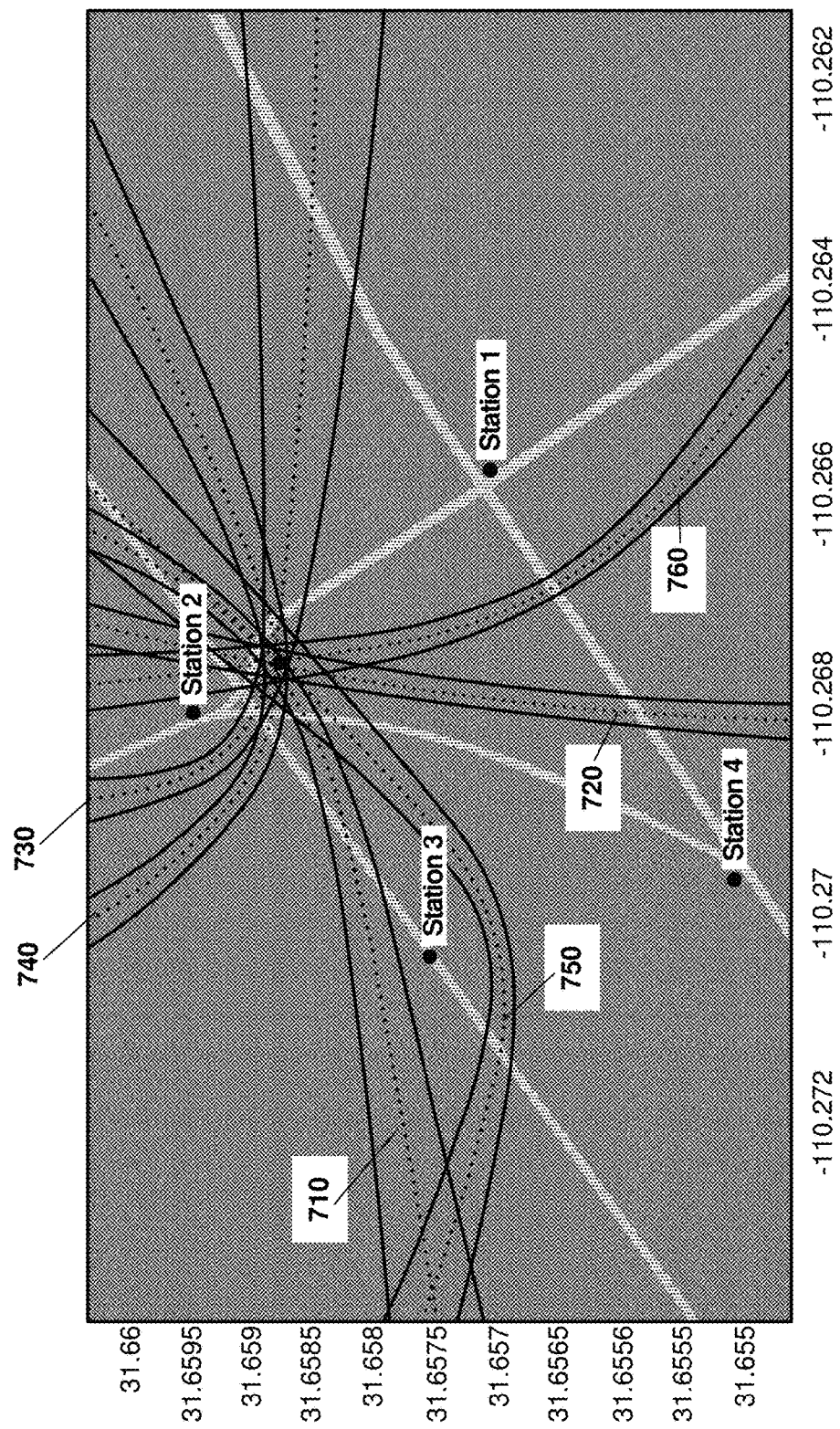
FIG. 8 illustrates an example of using Time-Difference-of-Arrival (TDOA) hyperbolas to localize an RFI emitter in accordance with some embodiments of the present technology.

FIG. 8 illustrates an example of using TDOA hyperbolas to localize an RFI in accordance with some embodiments of the present technology. In this experiment, the RFI emitter used was a 10 mW device manufactured by NEAT. The purpose of the test was to collect data and use TDOA and PDOA to locate the interference source for both front-ends. Before the localization tests were performed, the NEAT was experimented with in order to find the maximum range that each of its interference modes had. At high-power mode, each jamming type was seen for around 500 meters so the receivers were placed to create a configuration within a 500 meter per side square. For the test with the SiGe front-end, four receivers were used and placed in a square-like configuration that had a road run through its diagonal. Each station consisted of a laptop, a SiGe front-end module, and a UBlox antenna. In this situation, the antennas were placed on the ground with no attention paid to the orientation or terrain. The test consisted of turning on the NEAT device at three separate locations with 10 seconds of wide-band interference, a minute with no interference, and then ten seconds of CW interference.

As can be seen in FIG. 8, in the presence of interference, the hyperbolas all converge to a point. Each parabola represents the addition of another receiver. Hyperbola 710 is the time difference result between stations 1 and 2. Hyperbolas 720 and 730 are between station 3 and stations 1 and 2. Hyperbolas 740, 750, and 760 are between station 4 and stations 1, 2, and 3. The dashed lines represent the first standard deviation after performing a TDOA calculation ten times with an integration time of 15 ms.

Figure 9:
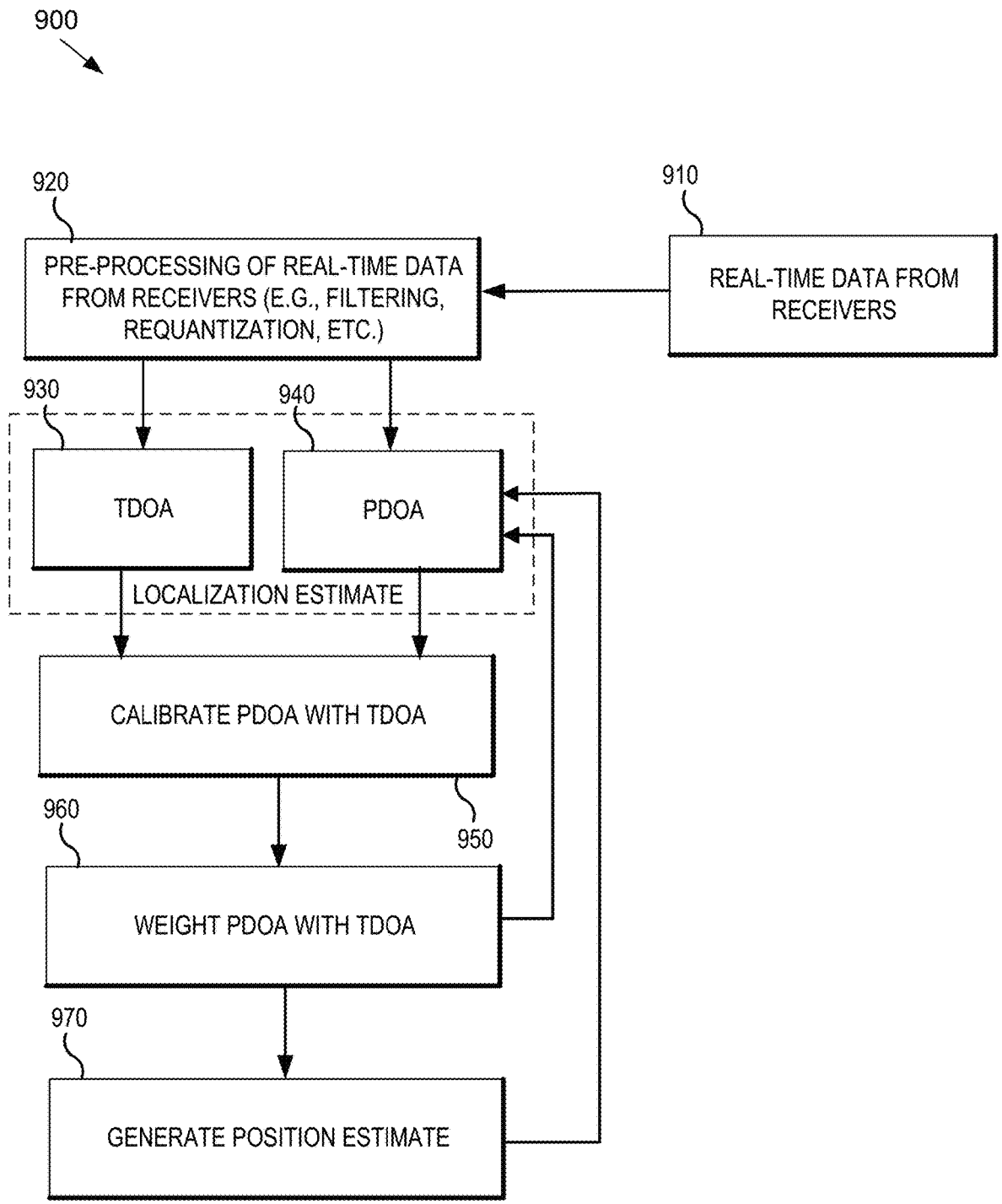
FIG. 9 is a flowchart illustrating a set of operations for localizing an RFI emitter by utilizing multiple localization algorithms in accordance with some embodiments of the present technology.

FIG. 9 is a flowchart illustrating a set of operations 900 for localizing an RFI emitter by utilizing multiple localization techniques in accordance with some embodiments of the present technology. In this example, TDOA and PDOA localization algorithms are utilized to locate an RFI emitter. First in flowchart 900, operation 910 collects real-time data from the receivers. Next, the real-time data is pre-processed (e.g., filtering, requantization, etc.) in operation 920. The processed data is then provided to the localization algorithms to determine localization estimates for TDOA in operation 930 and PDOA in operation 940.

For TDOA in operation 930, localization is achieved through finding the difference in time it takes for the interference signal to reach two receivers and using the time differences to create a hyperbola of possible emitter locations. With more than one pair of receivers, the estimation of the emitter's location lies at the intersection of hyperbolas. In order to calculate the estimated position, a non-linear least squares algorithm needs to be implemented. In the presence of an emitter, there is a signal s(t) sent from the emitter and received by n number of receivers. $\tau_i$ is the time it takes to reach each receiver depending on how far the receiver is from the emitter. This results in the received signal being $y_i=a_i s(t-\tau_i)+e_i(t)$, i=1, 2, 3 . . . n where $a_i$ is the amplitude of the signal and $e_i$ is white noise.

Once an interference signal is present, the IF data of each receiver is converted to baseband and cross-correlated to find $\Delta_T$ using a non-linear least squares algorithm. This cross-correlation can be performed through many different techniques, e.g. time-domain, frequency-domain, complex ambiguity function etc. The distance difference is then calculated by multiplying the time difference by the speed of light, c. Since the receivers are not synchronized, the difference in first sample time must also be multiplied by the speed of light and subtracted from the distance difference.

$$\Delta d_{i,j} = c(\Delta \tau_{i,j} - t_{s_{i,j}})$$

With two receivers at $(x_i, y_i)$ and $(x_j, y_j)$ and potential emitter at $(x,y)$, the distances between each receiver and the emitter can be computed as shown below.

$$d_i = \sqrt{(x-x_i)^2 + (y-y_i)^2}$$

$$d_j = \sqrt{(x-x_j)^2 + (y-y_j)^2}$$

From these, the difference in distance that corresponds to a hyperbola of potential emitter locations can be calculated.

$$h(x,y,x_i,y_i,x_j,y_j) = d_j - d_i$$

With an arbitrary number of receivers, several hyperbolic lines are calculated and in the presence of interference they should intersect at the emitter's position. However, due to the noise present, this is not the case. Usually the intersection is not closed to a point. With a non-linear least squares algorithm it is possible to find the best estimation of the emitter location using the hyperbolic lines present. A grid of points is created and the estimate is found using the equation below.

$$\hat{P}_{TDOA} = \min_{(x,y)} \sum_{i<j} (\Delta d_{i,j} - h(x, y, x_i, y_i, x_j, y_j))^2$$

Most often, there are hyperbolas that do not converge with the rest of them. These hyperbolas can be weighted less by using a weighted non-linear least squares algorithm. It is recommended to implement some thresholds so that one hyperbola is not overemphasized; thus, skewing the location estimation. If $x_{est}$ and $y_{est}$ are the coordinates of the estimated position, then a weighted approach would look like the following:

$$\hat{P}_{wTDOA} = \min_{(x,y)} \sum_{i<j} W_{TDOA} (\Delta d_{i,j} - h(x, y, x_i, y_i, x_j, y_j))^2$$

$$W_{TDOA} = \frac{1}{(\Delta d_{i,j} - h(x_{est}, y_{est}, x_i, y_i, x_j, y_j))^2}$$

For PDOA in operation 940, the PDOA algorithm depends on the difference in received signal strength instead of the difference in time of arrival. Since the SiGe front end's AGC value is in voltage, the AGC voltage must first be mapped to a dB scale. There can also be slight differences in the nominal AGC voltage for each SiGe receiver; therefore, some embodiments keep track of the difference between the received power and the receiver's nominal value. The AGC of the SiGe is much more volatile in small intervals of time so various embodiments average at least a second of AGC data and use the resulting average. This also makes it easy to synchronize multiple receivers and use significantly less processing power.

Similar to TDOA, with two receivers at $(x_i, y_i)$ and $(x_j, y_j)$ and potential emitter at $(x,y)$, the distances between each receiver and the emitter can be computed as shown below.

$$d_i = \sqrt{(x-x_i)^2 + (y-y_i)^2}$$

$$d_j = \sqrt{(x-x_j)^2 + (y-y_j)^2}$$

However, the power equations differ significantly in its use in the non-linear least squares algorithm. The received power difference between two receivers, would result in:

$$P_{i,j} = P_i - P_j = 10\alpha \log_{10} \frac{d_j}{d_i}$$

where $\alpha$ is the path-loss coefficient,
Since the distances have square roots, this equation can be expanded to the following:

$$P_{i,j} = 5\alpha \log_{10} \frac{(x-x_j)^2 + (y-y_j)^2}{(x-x_i)^2 + (y-y_i)^2}$$

To implement the least squares algorithm, the computed difference in power has to be compared to the actual difference in received power to find the most likely point of the emitter. Typically, the path-loss coefficient, $\alpha$ is highly variable and difficult to estimate. Using $P_{i,j,true}$ as the true difference in received power, the non-linear least squares algorithm becomes the following equation.

$$\hat{P}_{PDOA} = \min_{(x,y)} \sum_{i<j} \left( P_{i,j,true} - 5\alpha \log_{10} \frac{(x-x_j)^2 + (y-y_j)^2}{(x-x_i)^2 + (y-y_i)^2} \right)^2$$

Calibration of the PDOA path-loss coefficients may be determined by using TDOA in operation 950. If the estimate from the weighted TDOA algorithm is $x_{est}$ and $y_{est}$, then the calibrated path coefficients for the PDOA algorithm can be determined using:

$$\hat{\alpha}_{cal} = \min_{(\alpha)} \sum_{i<j} \left( P_{i,j,true} - 5\alpha_{i,j} \log_{10} \frac{(x_{est}-x_j)^2 + (y_{est}-y_j)^2}{(x_{est}-x_i)^2 + (y_{est}-y_i)^2} \right)^2$$

where the $\alpha$ values for each pair of receivers is found after looping through an array of possible values.

After finding the calibrated path-loss coefficients for each pair of receivers, the weights of the PDOA algorithm can be determined in operation 960 using:

$$W_{PDOA} = \frac{1}{\left( P_{i,j,true} - 5\hat{\alpha}_{cal} \log_{10} \frac{(x_{est}-x_j)^2 + (y_{est}-y_j)^2}{(x_{est}-x_i)^2 + (y_{est}-y_i)^2} \right)^2}$$

With the weights for the PDOA algorithm, the combined non-linear least squares algorithm can be implemented in operation 970 to generate position estimates. An important step is to normalize the weights of both the TDOA and the PDOA so that one does not overpower the other. For TDOA, the weights from the weighted non-linear least squares algorithm will be the same.

$$\hat{P}_{Hybrid} = \min_{(x,y)} \sum_{i<j} W_{PDOA} \left( P_{i,j,true} - 5\alpha \log_{10} \frac{(x-x_j)^2 + (y-y_j)^2}{(x-x_i)^2 + (y-y_i)^2} \right)^2 +$$

$$W_{TDOA} (\Delta d_{i,j} - h(x, y, x_i, y_i, x_j, y_j))^2$$

Figure 10:
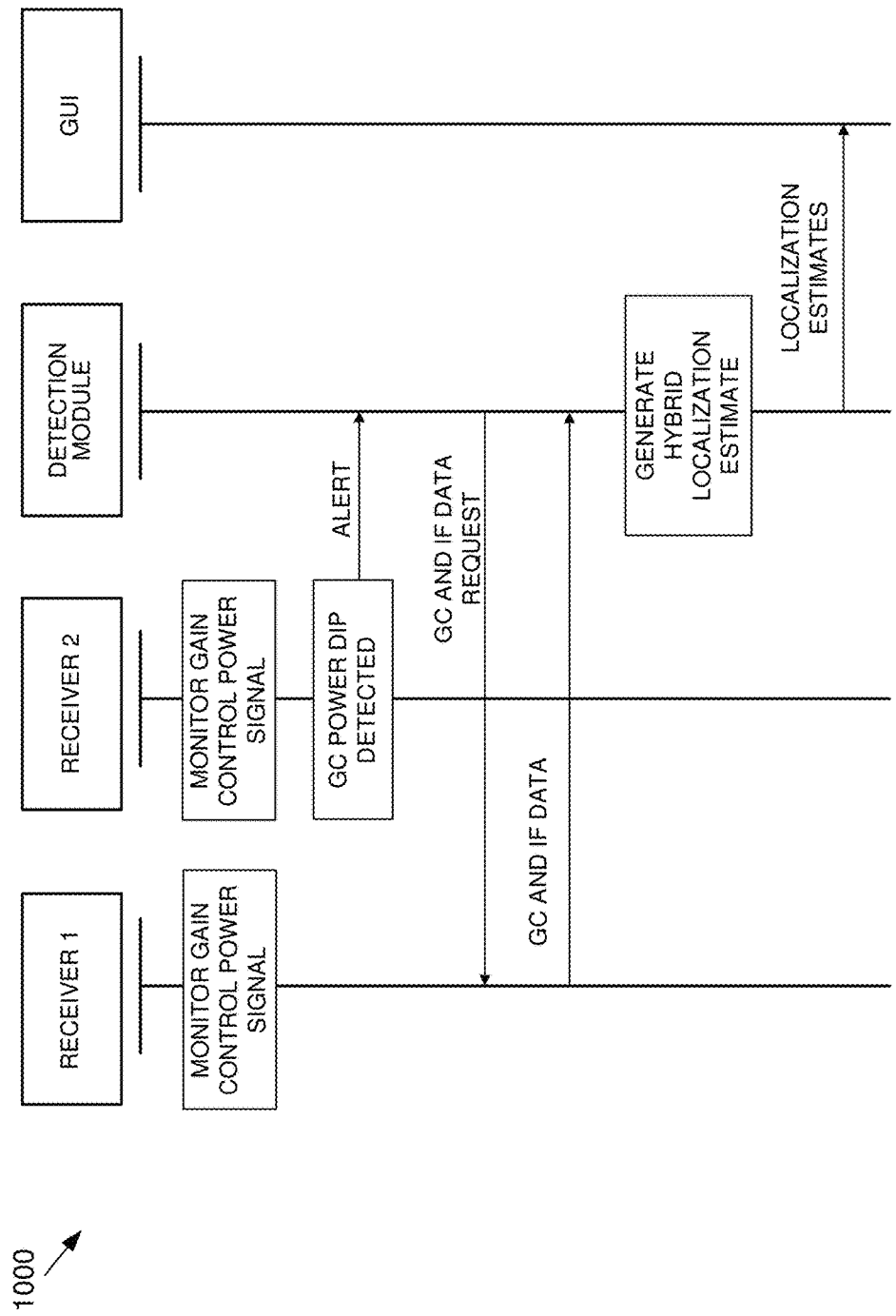
FIG. 10 is a sequence diagram illustrating an example of the data flow between the various components of a detection and localization system in accordance with various embodiments of the present technology.

FIG. 10 is a sequence 1000 diagram illustrating an example of the data flow between the various components of a detection and localization system in accordance with various embodiments of the present technology. Receiver 1 and 2 monitor their automatic gain control (AGC) power signal. If the AGC power dips below a threshold, then an RFI emitter has been detected and the detection module is alerted. Once the detection module is notified, the detection module requests AGC and IF data from all of the receivers. Based on the collected data, the detection module generates a hybrid localization estimate for the RFI emitter and transmits the estimate to a Graphical User Interface (GUI) to be displayed.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method for dynamically detecting and localizing a radio frequency interference (RFI) emitter, the method comprising:
   monitoring a power measurement of a Global Navigation Satellite System (GNSS) signal at three or more receivers;
   determining that the power measurement of the GNSS signal has exceeded a designated threshold; and
   after determining the power measurement of the GNSS signal has exceeded the threshold:
   processing the power measurements of the GNSS signal from each of the three or more receivers to locate the RFI emitter; and
   generating hybrid location estimates for the RFI emitter by utilizing multiple localization estimates for the RFI emitter based on the processed power measurements,
   wherein generating the hybrid location estimates comprises calibrating path-loss coefficients for a power-difference of arrival (PDOA) localization estimate based on a time-difference-of-arrival (TDOA) localization estimate.

2. The method of claim 1, wherein generating the hybrid location estimates further comprises generating the estimates using nonlinear least squares.

3. The method of claim 1, wherein utilizing multiple localization estimates to generate the hybrid location estimates comprises generating the hybrid location estimates with at least a TDOA technique and a PDOA technique.

4. The method of claim 3, wherein generating the hybrid location estimates with the TDOA technique comprises finding a localization estimate for the RFI emitter with a weighted non-linear least squares technique.

5. The method of claim 3, wherein generating the hybrid location estimates further comprises determining the location of the RFI emitter with the use of a combined weighted non-linear least squares technique.

6. The method of claim 1, wherein the RFI emitter is continuously localized by a reiterative position estimate.

7. The method of claim 1 further comprising directing, in response to determining the power measurement of the GNSS signal has crossed the threshold, the three or more receivers to transmit the power measurements to a device.

8. The method of claim 1 further comprising setting the threshold according to a sensitivity level selected by a user of the GNSS.

9. A system for detecting and localizing a radio frequency interference (RFI) emitter comprising:
  a sensor to measure power from a signal generated by a satellite system;
  a processor; and
  a memory having stored thereon program instructions that, when executed by the processor, cause the system to:
    detect a change in power exceeding a designated threshold of the signal generated by the satellite system;
    generate, in response to the change in the power of the signal exceeding the designated threshold being detected, processed data from intermediate frequency (IF) data collected from multiple receivers;
    generate at least two localization estimates for the RFI emitter based on the processed data;
    compute a path-loss coefficient for a power-difference-of-arrival (PDOA) localization estimate based on a time-difference-of-arrival (TDOA) localization estimate; and
    generate a position estimate for the RFI emitter based on the at least two localization estimates.

10. The system of claim 9, wherein the satellite system is a Global Navigation Satellite System (GNSS).

11. The system of claim 9, wherein the sensor to measure power from the signal generated by the satellite system uses automatic gain control (AGC).

12. The system of claim 9, wherein when executed by the processor to generate the processed data, the program instructions further cause the system to at least filter the real-time IF data.

13. The system of claim 9, wherein when executed by the processor, the program instructions further cause the system to reiteratively estimate the position of the RFI emitter using previous estimations of position to scale weights of the localization estimates.

14. The system of claim 13, wherein when executed by the processor to reiteratively estimate the position, the program instructions further cause the system to track the RFI emitter through time.

15. The system of claim 9, wherein the at least two localization estimates include the TDOA localization estimate and the PDOA localization estimate.

16. The system of claim 9, wherein when executed by the processor to generate the position estimate for the RFI emitter, the program instructions further cause the system to generate the position estimate by weighting the at least two localization estimates.

17. A method for localizing a position of an interference source, the method comprising:
  processing data collected by at least three receivers;
  generating at least two localization estimates for the interference source based on the processed data, wherein generating the at least two localization estimates comprises calibrating path-loss coefficients for a power-difference of arrival (PDOA) localization estimate based on a time-difference-of-arrival (TDOA) localization estimate; and
  generating a hybrid position estimate for the interference source based on the at least two localization estimates.

18. The method of claim 17, wherein generating the at least two localization estimates further comprises generating the TDOA localization estimate and the PDOA localization estimate.

19. The method of claim 17, wherein generating the hybrid position estimate for the interference source further comprises weighting the at least two localization estimates.

20. The method of claim 19, wherein generating the hybrid position estimate for the interference source further comprises reiteratively estimating the position of the interference source using previous estimations of position to scale the weights of the localization estimates and track the interference source through time.

21. The method of claim 17, wherein processing the data comprises processing the data collected by the at least three receivers in real-time.

* * * * *

UNITED STATES PATENT AND TRADEMARK OFFICE
CERTIFICATE OF CORRECTION

PATENT NO. : 11,280,912 B2
APPLICATION NO. : 16/246177
DATED : March 22, 2022
INVENTOR(S) : Dennis M. Akos et al.

It is certified that error appears in the above-identified patent and that said Letters Patent is hereby corrected as shown below:

On the Title Page (73), Assignee, after "The Regents of the University of Colorado" add --, a body corporate--

In the Specification

Column 6, Line 13, after "120A-" delete "120D" and insert --120N--

Column 6, Line 14, delete "110N" and insert --110D--

Column 12, Line 63, delete "$5\alpha \log_{10}$" and insert --$5\hat{\alpha}_{cal} \log_{10}$--

Signed and Sealed this
Seventeenth Day of October, 2023

Katherine Kelly Vidal
*Director of the United States Patent and Trademark Office*